United States Patent [19]
Takahashi et al.

[11] Patent Number: 5,600,555
[45] Date of Patent: Feb. 4, 1997

[54] PART ARRANGEMENT OPTIMIZING METHOD

[75] Inventors: Masanobu Takahashi; Kazuo Kyuma, both of Hyogo, Japan

[73] Assignee: Mitsubishi Denki Kabushiki Kaisha, Tokyo, Japan

[21] Appl. No.: 242,888

[22] Filed: May 16, 1994

[30] Foreign Application Priority Data

May 20, 1993 [JP] Japan .................................. 5-139842

[51] Int. Cl.⁶ .................................................. G06F 17/60
[52] U.S. Cl. ..................... 395/201; 364/489; 364/474.13
[58] Field of Search ....................... 364/488–91, 148–51, 364/153, 156, 194, 474.13

[56] References Cited

U.S. PATENT DOCUMENTS

| | | | |
|---|---|---|---|
| 3,617,714 | 11/1971 | Kernighan et al. | 235/150 |
| 4,630,219 | 12/1986 | DiGiacomo et al. | 364/488 |
| 4,829,446 | 5/1989 | Draney | 364/488 |
| 5,144,563 | 9/1992 | Date et al. | 364/491 |
| 5,175,693 | 12/1992 | Kurosawa et al. | 364/491 |
| 5,187,668 | 2/1993 | Okude et al. | 364/468 |

OTHER PUBLICATIONS

Marvin A. Bluer "Automatic Planning of Digital Computer" Oct. 29, 1973.

*Primary Examiner*—Gail O. Hayes
*Assistant Examiner*—Steven R. Yount
*Attorney, Agent, or Firm*—Wolf, Greenfield & Sacks, P.C.

[57] ABSTRACT

The part arrangement optimizing method of the present invention is a part arranging method capable of obtaining part arrangements having smaller evaluation function values rapidly, and the method improves block arrangements so that evaluation function values such as total route lengths become small as much as possible by replacing plural blocks or block sets to determine the arrangements of parts on the basis of the arrangements of the blocks. Furthermore, as aforementioned improving method of the blocks, such a method as assigns expected positional coordinate to each part and arranges a block to a block arranging position near to the expected positional coordinate while renewing the expected positional coordinate so as to be located at the position where the evaluation function value becomes smaller.

9 Claims, 10 Drawing Sheets

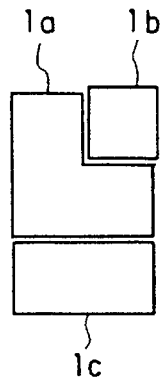
FIG. 3(a-1)
(PRIOR ART)
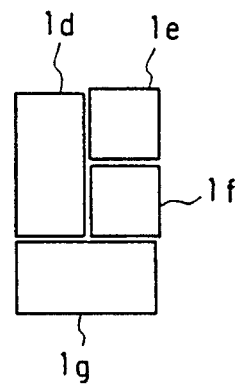
FIG. 3(a-2)
(PRIOR ART)
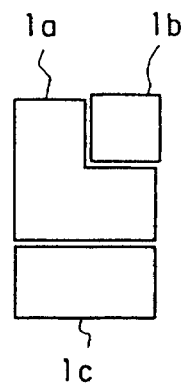
FIG. 3(b-1)
(PRIOR ART)
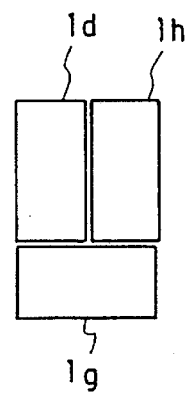
FIG. 3(b-2)
(PRIOR ART)
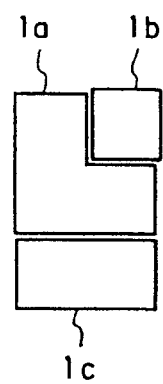
FIG. 3(c-1)
(PRIOR ART)
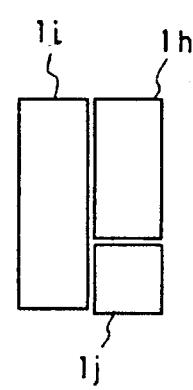
FIG. 3(c-2)
(PRIOR ART)

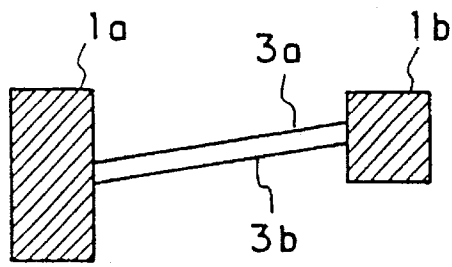
FIG. 8(a)
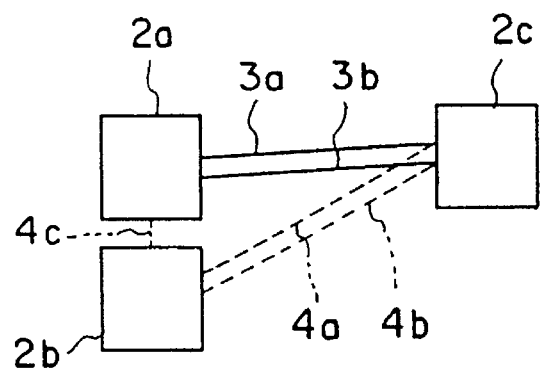
FIG. 8(b)
FIG. 9
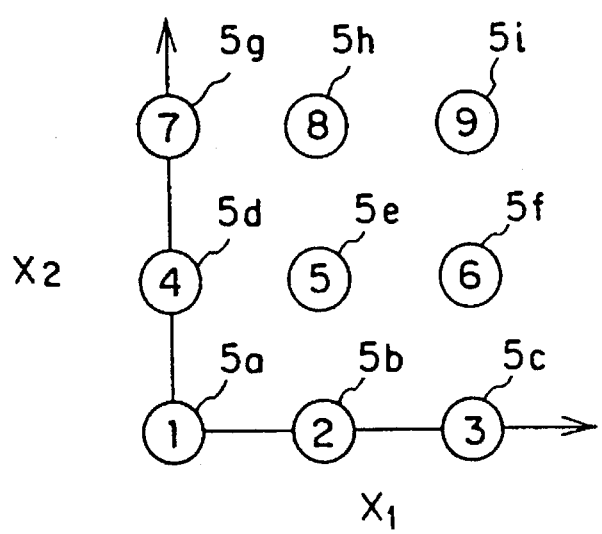

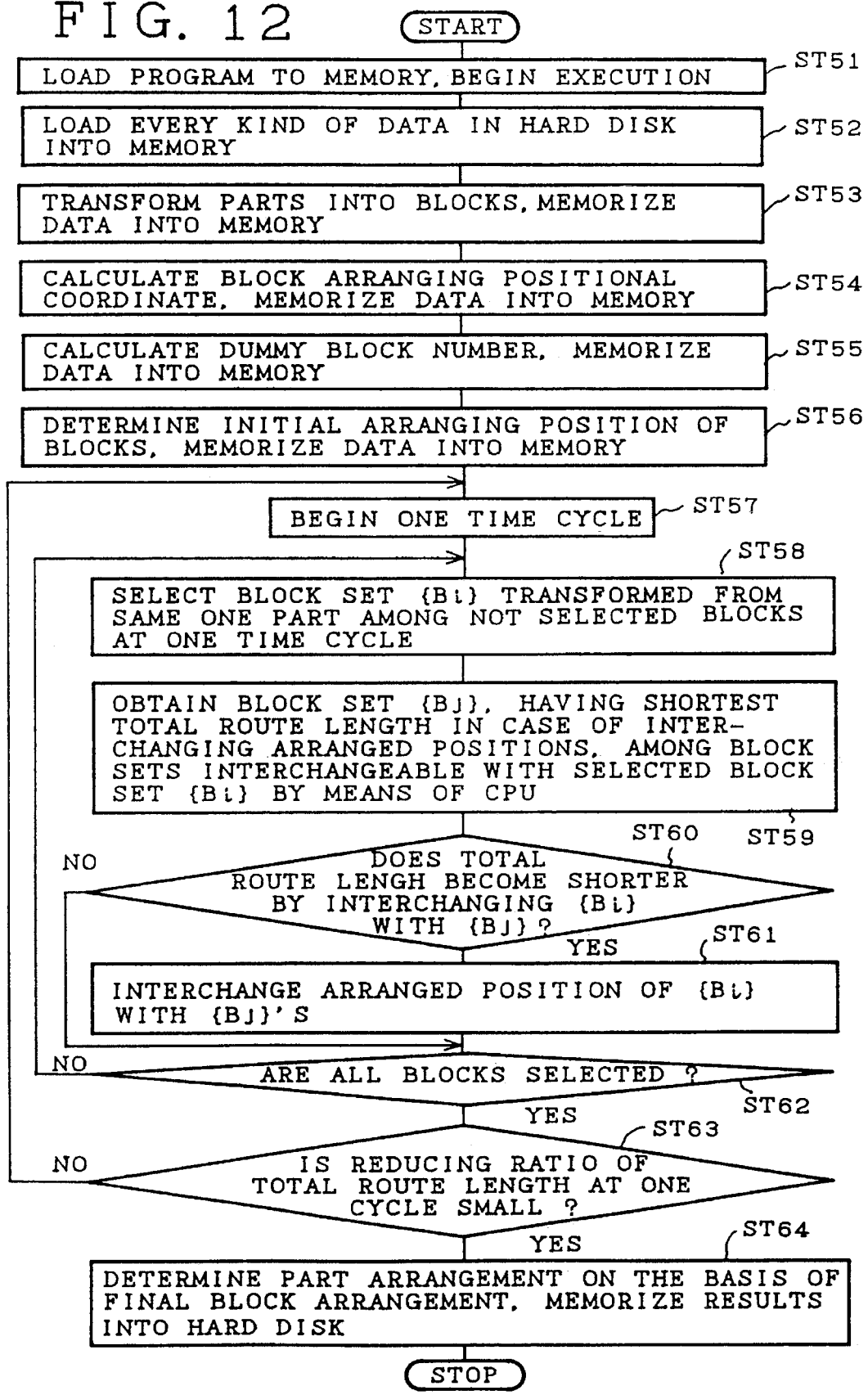

PART ARRANGEMENT OPTIMIZING METHOD

BACKGROUND OF THE INVENTION

1. Field of the Invention

This invention relates to a part arrangement optimizing method which determines the optimum part arrangement under some criterion for evaluation such as a total route length and the like.

2. Description of the Prior Art

FIG. 1 is a flow chart showing a prior art part arrangement optimizing method shown at the 259th page of "DEJITARU KEISANKI NO JIDO SEKKEI (Automated Designing for Digital Computers)," KONPYUTA SAIENSU HONYAKU SENSYO /3 (Translated Selections on Computer Science /3), Mervyn Bloor (ed.), Toshio Ikeda (rev.), Takao Hayashi (trans.), Sangyo Tosho, Tokyo, Oct. 29, 1973 (1st ed.). FIG. 2(a) and FIG. 2(b) are explanatory drawings respectively showing an example of the optimum part arrangement and a non-optimum part arrangement. FIG. 3(a) through FIG. 3(c) are conceptual drawings for explaining interchangeable parts in the part arrangement optimizing method based on the pairwise interchanging method shown in FIG. 1. In FIGS. 2(a) and 2(b), reference numeral 1 designates a part to be arranged in this part arrangement optimizing method; and numeral 3 designates an actual route connecting each part 1 mutually. Also, in FIGS. 3(a) through 3(c), reference numerals 1a, 1b, . . ., 1j designate the same kind of parts as those designated by reference numeral 1 in FIGS. 2(a), 2(b).

Next, the operation of the prior art part arrangement optimizing method will be described. Hereinafter, the case, where the optimum part arrangement is determined by, for example, the total route length as a criterion for evaluation will be described. For an exercise, a problem which finds the shortest total extension of the route length in the case where the positions of arranged parts and the number of routes among the four parts, which is shown in the following table 1, are given will be considered.

TABLE 1

|  |  | PARTS NUMBER | | | |
|---|---|---|---|---|---|
|  |  | 1 | 2 | 3 | 4 |
| PARTS | 1 | 0 | 3 | 3 | 1 |
| NUMBER | 2 | 3 | 0 | 1 | 3 |
|  | 3 | 3 | 1 | 0 | 3 |
|  | 4 | 1 | 3 | 3 | 0 |

An example of the optimum solution is shown in FIG. 2(a), and an example of a non-optimum solution by which the total extension of routes is longer than the optimum solution's is shown in FIG. 2(b). There is no analytical solution in such problems as finding the optimum part arrangement, then it is generally required to examine all possible arrangements for finding the optimum solution. However, there are N! combinations of arrangements to N parts, and the time required to the calculation for finding the optimum solution exponetially increases as the part number N increases. Namely, this problem of finding the optimum part arrangement is a kind of the combinational optimization problem. It is usually aimed to find quickly a solution near the optimum solution (or approximate solution) accordingly for solving the problem.

FIG. 1 is a flow chart showing the pairwise interchanging method which is the most basic algorithm among such part arrangement optimizing methods. Although the part arrangement optimizing methods originally deal with the cases where all part sizes are almost the same and all parts can interchange their arranged positions with those of all other parts, hereinafter the part arrangement optimizing method which is improved to be able to deal with problems including different sized parts will be described more generally.

After starting the processes, parts are initially arranged at first (STEP ST1). This initial arrangement of parts may be done randomly, or may be determined so that the total route length becomes somewhat shorter by applying methods such as the pair-linking method, the cluster-developing method, the force placement method or the like. If there are more positions for part arrangement than the total number of parts, vacant areas where any part are not arranged are produced. In that case, dummy parts which are not connected with any other part are arranged at the vacant areas for the time being. And after determining the final part arrangement, the places occupied with the dummy parts are made vacant. Next, a one time cycle is begun (STEP ST2). Then, one part Bi which was not selected at the one time cycle yet is selected (STEP ST3). Therein, the suffix "i", of "B" is made to designate the number of a part. In STEP ST3, dummy parts are not selected. Next, a set of parts {Bj}, the arranged positions of the element parts Bj of which make the total route length shortest by interchanging them with the arranged position of the selected part Bi, is obtained from the set interchangeable with the part Bi (the dummy parts may be included in this case) (STEP ST4).

Now, the set of the parts interchangeable with the part Bi will be described with FIGS. 3(a) through 3(c). Supposing the selected part Bi is the part 1a, the pair of the parts 1d and 1f, the pair of the parts 1d and 1e, and the pair of the parts 1g and 1f are the set interchangeable with the part 1a in case of FIG. 3(a). On the other hand, there is no part set interchangeable with the part 1a in the case of FIG. 3(b). In the case of FIG. 3(c), too, because the part 1i is different from the part 1a in shape despite being same in size, the part 1i cannot be interchanged with the part 1a, thus there are no part set interchangeable with the part 1a. As mentioned above, the part sets which have the same sizes and shapes as those of the part 1a in case of being combined are the interchangeable part sets.

Next, it is judged whether the total route length becomes shorter or not in case of interchanging the arranged position of the part Bi with that of the part set {Bj} in comparison with the case of non-interchanging (STEP ST5). The arranged positions of the part Bi and the parts set {Bj} are interchanged if the judgement shows that the total route length becomes shorter (STEP ST6), and if the judgement shows that the total route length does not become shorter, the STEP ST 6 is skipped so as not to interchange the part Bi with the parts set {Bj}. Next, it is judged whether all of the parts were selected at the one time cycle or not (STEP ST7). If the result of the judgement shows that there are some parts not selected yet, then the system returns to STEP ST3 and selects the next part among the residual parts except for the dummy parts. On the other hand, if all of the parts have been selected, it is judged whether the reducing rate of the total route length by the one time cycle is smaller than a predetermined value or not (STEP ST8). If the reducing rate is somewhat larger, there is much improving capability in the arrangement, then the system returns to STEP ST2 and begins the next cycle. If the reducing rate is smaller than the predetermined value, the system ends at that place, and finally the part arrangement the total route length of which is reduced is obtained.

Besides, there are other methods such as the relaxation method, a combined method of the relaxation method and the pairwise interchanging method (i.e. the relaxation method according to force directions) and the like as the prior art part arrangement optimizing methods. These methods, too, basically contain steps interchanging or replacing two or more parts and part sets.

Because the prior art part arrangement optimizing methods are constructed as mentioned above, the number of part sets interchangeable with selected part becomes smaller as the kinds of part sizes, especially part shapes, become more, then the capability of interchanging parts decreases as a result of it. Consequently, the prior art methods have problems that they cannot reduce evaluation function values such as the total route length and the like greatly in such cases, and that they cannot obtain good arrangement results which are almost the same as those determined by experts after their long examining.

SUMMARY OF THE INVENTION

In view of the foregoing, it is an object of the present invention to provide a part arrangement optimizing method capable of interchanging a certain part with parts or part sets which have the same sizes as that of the part in spite of their shapes being different from that of the part, the method having large number of parts or proposals of parts which can be interchanged, further the method being able to arrange parts so that evaluation function values such as the total route length and the like are smaller as a result.

It is another object of the invention to provide a part arrangement optimizing method capable of further increasing interchangeable parts or proposals of parts.

It is a further object of the invention to provide a part arrangement optimizing method capable of more rapidly obtaining part arrangements whose evaluation function values such as the total route length and the like are smaller.

It is a further object of the invention to provide a part arrangement optimizing method easy to process the determination of the arrangements of blocks.

It is a further object of the invention to provide a part arrangement optimizing method easy to process the determination of the arrangement positions of parts from block arrangements.

According to the first aspect of the invention, for achieving the above-mentioned objects, there is provided a part arrangement optimizing method which suppositionally transforms parts into blocks or block sets uniform in size, determines the arrangements of the blocks so that evaluation function values become small as much as possible, and determines part arranging positions on the basis of determined block positions.

As stated above, the part arrangement optimizing method according to the first aspect of the invention increases the proposals of interchangeable parts by determining part arranging positions on the basis of block positions determined so that the evaluation function values become small as much as possible in a state that the parts are transformed into the blocks or the block sets uniform in size, and consequently, the method can obtain the part arrangements the evaluation function values of which are smaller.

According to the second aspect of the invention, there is provided a part arrangement optimizing method which alters the suppositional transforming system of parts of the first aspect to one in which the size ratios of blocks or block sets are integers.

As stated above, the part arrangement optimizing method according to the second aspect of the invention suppositionally transforms parts into blocks or block sets by transforming them so that the size ratios of the blocks or the block sets are integers.

According to the third aspect of the invention, there is provided a part arrangement optimizing method which assigns expected positional coordinates to each part and arranges the parts at part arranging positions near the expected positional coordinate while renewing the expected positional coordinates so as to be located at the position where evaluation function values become small as much as possible.

As stated above, the part arrangement optimizing method according to the third aspect of the invention makes it possible to rapidly obtain a part arrangements whose evaluation function values are smaller by arranging parts at part arranging positions near expected positional coordinates while renewing the expected positional coordinates assigned to each part so that the evaluation function values become small as much as possible.

According to the fourth aspect of the invention, there is provided a part arrangement optimizing method determines part arranging positions on the basis of finally determined block arrangements arranged at block arranging positions near expected positional coordinates while renewing the expected positional coordinates so that the coordinates locate at positions where their evaluation function values become small as much as possible by assigning the expected positional coordinates to each block after suppositionally transforming parts into blocks uniform in size.

As stated above, the part arrangement optimizing method according to the fourth aspect of the invention enables to rapidly obtain part arrangements the evaluation function values of which are smaller by determining part arranging positions on the basis of finally determined block arrangements by processing in the same way as mentioned above after transforming parts into blocks uniform in size.

According to the fifth aspect of the invention, there is provided a part arrangement optimizing method which alters the suppositional transforming system of parts of the fourth aspect to transform so that the size ratios of blocks become integers.

As stated above, the part arrangement optimizing method according to the fifth aspect of the invention suppositionally transforms parts into blocks by transforming them so that the size ratios of the blocks become integers.

According to the sixth aspect of the invention, there is provided a part arrangement optimizing method which executes the determination of the block arrangements in the first or the second aspect by replacing plural blocks or block sets.

As stated above, the part arrangement optimizing method according to the sixth aspect of the invention determines block arrangements by replacing plural blocks or block sets.

According to the seventh aspect of the invention, there is provided a part arrangement optimizing method which executes the determination of part arranging positions from block arrangements in the first, the second or the fourth to the sixth aspect with the consideration of the extent of the overlap of the block sets transformed from a part with the part, and evaluation function values.

As stated above, the part arrangement optimizing method according to the seventh aspect of the invention determines part arranging positions from the block arrangements determined with the consideration of the extent of the overlap of the block sets transformed from a part with the part, and evaluation function values.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 3(a-1), FIG. 3(a-2), FIG. 3(b-1), FIG. 3(b-2), FIG. 3(c-1) and FIG. 3(c-2) are conceptual drawings for explaining interchangeable parts in the prior art part arrangement optimizing method;

FIG. 8(a) and FIG. 8(b) are conceptual drawings showing the method introducing suppositional routes in the aforementioned embodiment;

FIG. 9 is an explanatory drawing showing an example of the block arranging positions of the aforementioned example;

FIG. 12 is a flow chart showing the algorithm of the aforementioned embodiment;

DETAILED DESCRIPTION OF THE PREFERRED EMBODIMENTS

Preferred embodiments of the present invention will now be described in detail on reference to the accompanying drawings.

EMBODIMENT 1.

Figure 1:
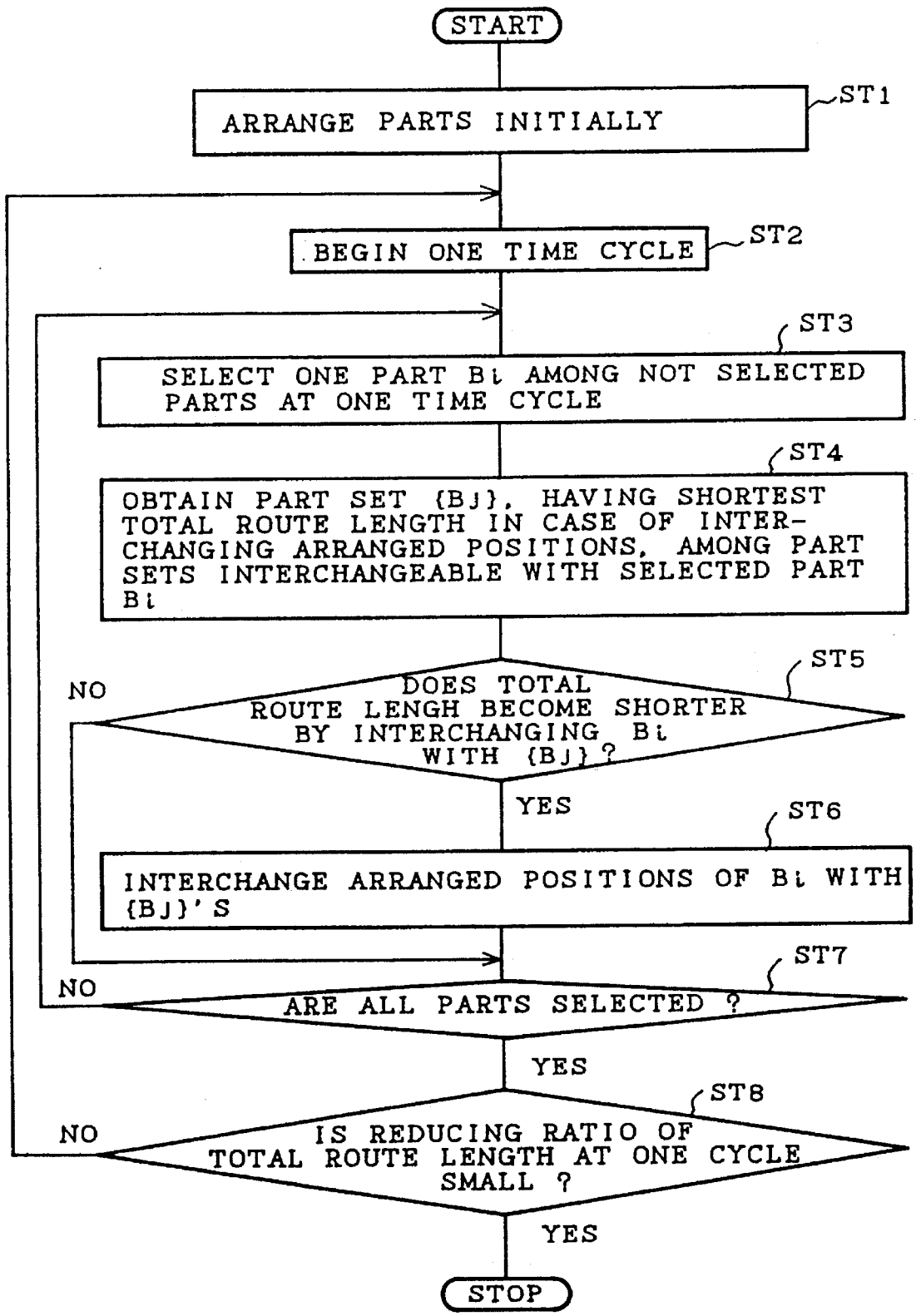
FIG. 1 is a flow chart showing a prior art part arrangement optimizing method.
Figure 2A:
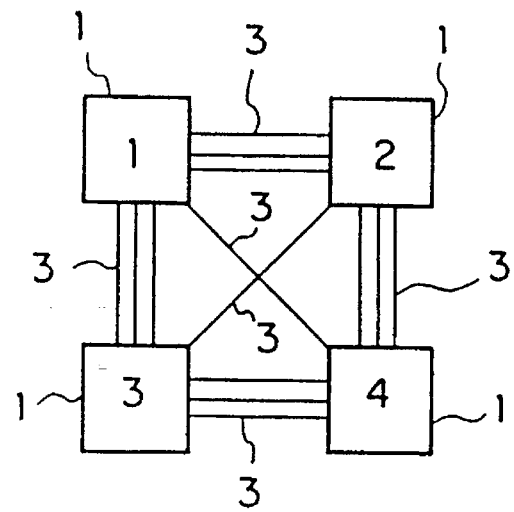
FIG. 2(a) and FIG. 2(b) are explanatory drawings respectively showing the optimum part arrangement and a non-optimum part arrangement.
Figure 2B:
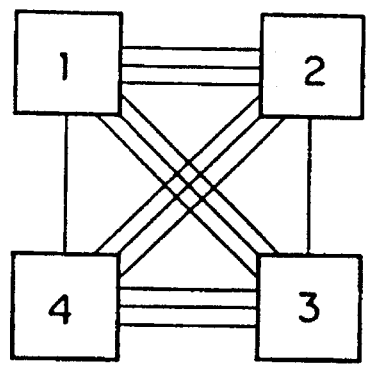
Figure 4:
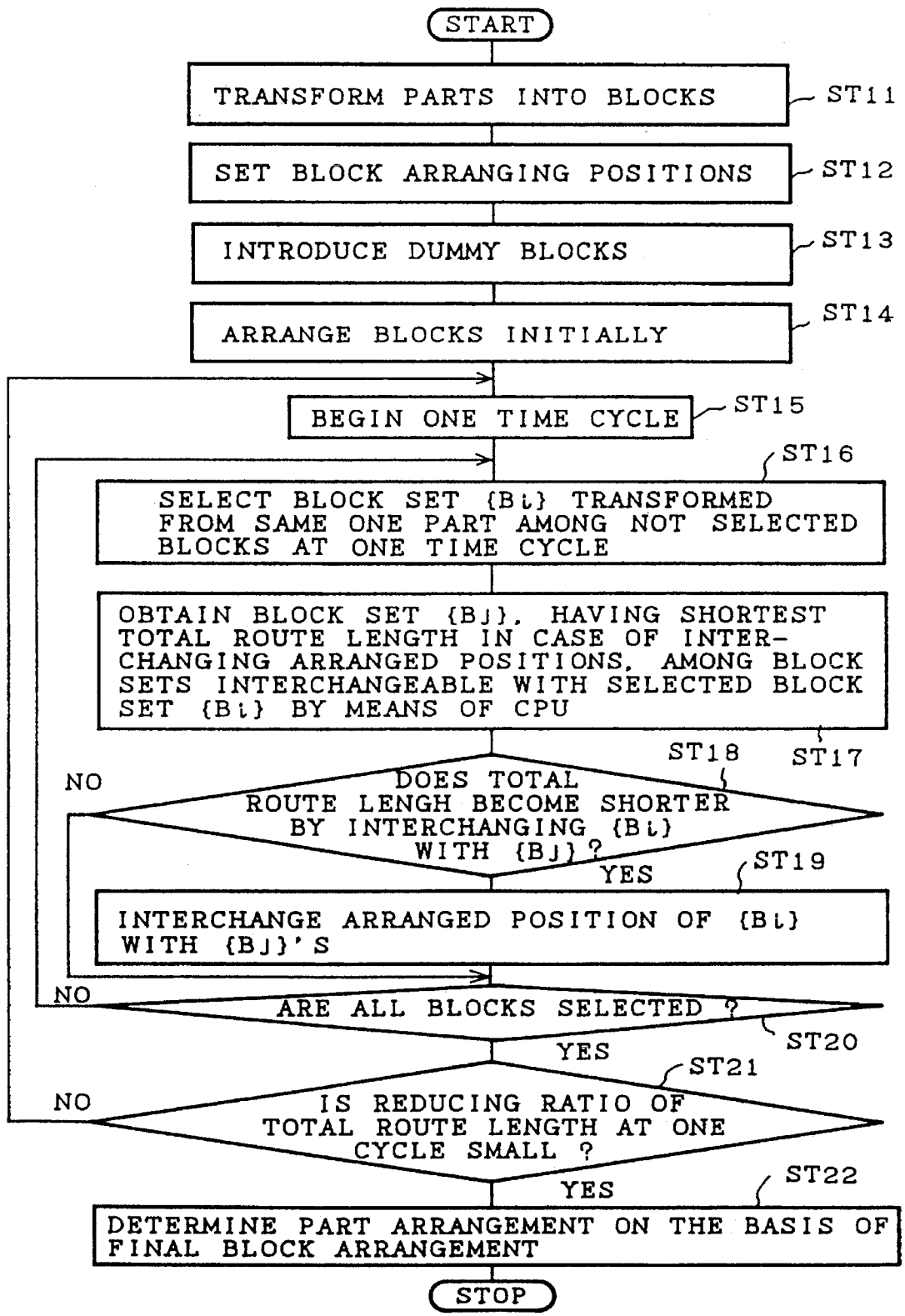
FIG. 4 is a flow chart showing the algorithm of the part arrangement optimizing method of the embodiment 1 of the present invention.
Figure 5:
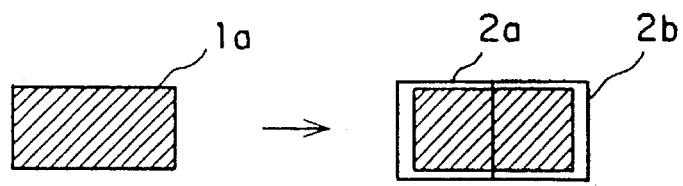
FIG. 5(a) and FIG. 5(b) are conceptual drawings showing the method transforming parts into blocks of the aforementioned embodiment.
Figure 5:
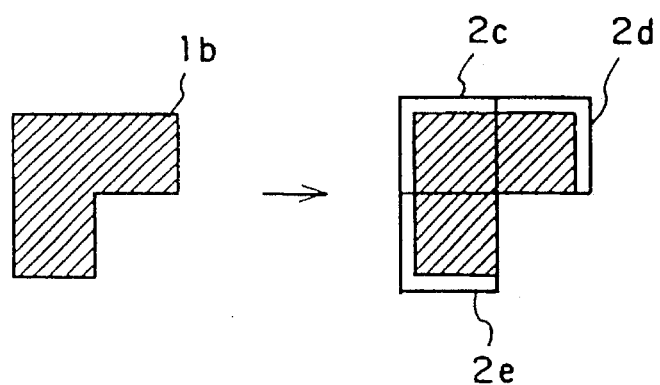
Figure 6:
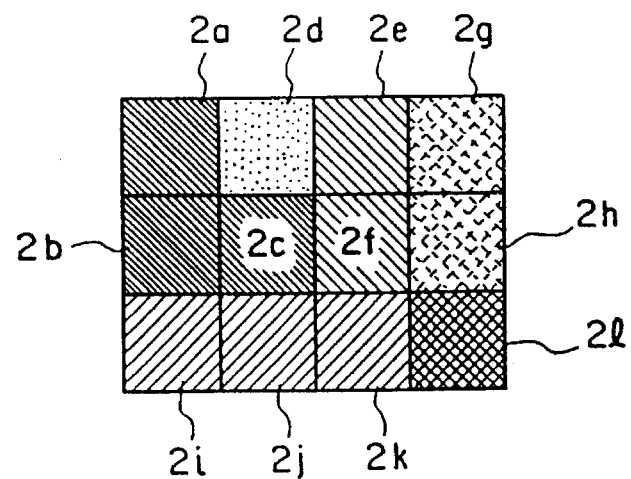
FIG. 6 is a conceptual drawing showing interchangeable blocks in the aforementioned embodiment.

FIG. 4 is a flow chart showing the algorithm of the part arrangement optimizing method of an embodiment of the present invention; FIG. 5(a) and FIG. 5(b) are conceptual drawings showing an example of a method transforming parts into blocks; and FIG. 6 is a conceptual drawing showing an interchangeable block set. In FIGS. 5(a) and 5(b), reference numerals 1a, 1b designate parts; and numerals 2a~2e designate blocks divided from the part 1a or 1b. These blocks 2a~2e are usually formed in regular squares, and have a predetermined uniform size. In FIG. 6, reference numerals 2a~2l designate aforementioned blocks, and the blocks divided from the same part are shown with the same textures.

Next, the operation of the embodiment will be described. After starting the process, parts 1a, 1b are suppositionally divided into the sets of blocks 2a, 2b or blocks 2c~2e respectively uniform in size, as shown in FIGS. 5(a), 5(b) at first. At that time, the parts 1a, 1b are transformed into block sets larger than the parts 1a, 1b as shown in FIGS. 5(a), 5(b). Although routes are calculated as if they are equipped from the center of a part when total route length is calculated, they are calculated as if they are equipped from a representative block or from a weight center position of block sets in the case of being transformed into block sets.

Next, block arranging positions are set (STEP ST12). The block arranging positions are usually set in a region where parts are arranged in an equally spaced lattice state. The interval of block arranging positions is made equal to a side of the block. Next, dummy blocks which have no route with other blocks are introduced so that the number of the blocks 2a~2e becomes equal to the number of block arranging positions (STEP ST13). After that, blocks are initially arranged (STEP ST14). When the blocks are arranged, the blocks transformed from the same part necessarily do not keep the shape of the original part, but they are arranged so as to adjoin with at least one other block mutually. So long as this condition is satisfied, the initial arranging positions of the blocks may be determined randomly, or may be determined so that total route length becomes shorter by some extent with methods such as the pair-linking method, the cluster-development method, the force placement method or the like.

Next, one time cycle is started (STEP ST15). After that, a block set {Bi} which is a set of blocks transformed from the same part (hereinafter referred to as "block set") is selected from the blocks which are not selected yet in the one time cycle (STEP ST16). Therein, the suffix "i" of "B" is arranged to designate the number of a block. In STEP ST16, dummy blocks are not selected. Next, a block set {Bj} which makes total route length shortest in case of interchanging arranged positions with the selected block set {Bi} is obtained from the block sets capable of being interchanged with the selected block set {Bi} (the dummy blocks may be included in this case) (STEP ST17).

Now, the block sets interchangeable with the block set {Bi} will be described. The block sets interchangeable with the block set {Bi} are block sets including the same number of blocks as that of the block set {Bi}, and one block of which block sets adjoins at least one other block in the same set, and further which block set contains all blocks transformed from a part. In FIG. 6, supposing that the selected block set {Bi} is {2a, 2b, 2c}, the interchangeable block sets become three kinds: {2d, 2e, 2f}, {2g, 2h, 2l} or {2i, 2j, 2k}. Besides, supposing that the selected block set {Bi} is {2e, 2f}, the interchangeable block set is only one kind of {2g, 2h}. As described above, the interchangeable block set is the set of blocks which have the same sizes in case of being combined, and which include all blocks transformed from the same part, and further which have no isolated blocks.

Next, it is judged whether the total route length becomes shorter or not in case of interchanging the arranged position of the block set {Bi} with that of the block set {Bj} in comparison with the case of non-interchanging (STEP ST18). The arranged positions of the block set {Bi} and the block set {Bj} are interchanged if the judgement shows that the total route length becomes shorter (STEP ST19); and if the judgement shows that the total route length does not become shorter, the STEP ST19 is skipped not to interchange the block set {Bi} with the block set {Bj}. At this time, the blocks transformed from the same part are arranged so as to adjoin at least one block mutually.

Next, it is judged whether all blocks except dummy blocks are selected at the one time cycle or not (STEP ST20). If the result of the judgement shows that there are some blocks not selected yet, then the system returns to STEP ST16 and selects the next block set among the residual blocks except for the dummy blocks. On the other hand, if all of the blocks are selected, it is judged whether the reducing rate of the total route length by the one time cycle is smaller than a predetermined value or not (STEP ST21). If the reducing rate is somewhat larger, there is improving capability still in the arrangement, then the system returns to STEP ST15 and begins the next cycle. If the reducing rate is smaller than the predetermined value, the system determines part arranging positions on the basis of the block arranging positions, and ends (STEP ST22).

Herein, when part arranging positions are determined on the basis of the block arranging positions, the shapes of block sets transformed from the same part are not always the same as the shapes of the original part. If the shapes are the same, the original part may be arranged to the place where the block set is located so long as no part is arranged there. Also, if the shapes are different, the parts are arranged, for example, to the positions which overlap most largely with the block sets transformed from the parts and do not overlap with the parts arranged already. If there is not an overlap at all because parts are arranged already, parts are arranged at the positions as near as possible to block sets. The arranging positions are determined from the largest part in the order of size. The steps mentioned above finally bring the (quasi-) optimum part arrangement in which total route length is short.

EMBODIMENT 2

In the embodiment 1 mentioned above, the case where the total route length is applied as the evaluation criterion of arrangements has been described, arbitrary evaluation criterions and the combinations of them may be used as the evaluation criterion so long as they can evaluate. In this case, the evaluation function is set so that its values become smaller as the arrangement becomes nearer to the optimum arrangement, then the evaluation function values may be used in the place of the total route length.

EMBODIMENT 3

In the aforementioned embodiment 1, the arrangements are improved by means of the method interchanging two blocks or block sets, that is to say the pairwise interchanging method, so that the total route length becomes shorter, however other methods such as the relaxation method and the like may be used so long as they are the methods interchanging or replacing two or more block sets, and they can also optimize the arrangements.

EMBODIMENT 4

In the aforementioned embodiment 1, the block sets can be interchanged under the condition that there are no isolated blocks in the block sets, however block sets may be interchangeable ones so long as they exist near to each other. In this case, also, the arrangements can be optimized.

EMBODIMENT 5

In the aforementioned embodiment 1, the arranging positions of all parts are not determined previously, however even if there are some parts the arranging positions of which are previously determined, that is to say fixed parts, the parts including the fixed parts can be optimized similarly by excepting the arranged positions of the fixed parts from the part arranging regions and the part arranging positions and making the fixed parts be always arranged at their arranged positions.

EMBODIMENT 6

In the aforementioned embodiment 1, the part arranging positioned are determined with the consideration of the overlap with the block sets in STEP ST22, however the part arranging positions may be determined with the consideration of the evaluation function values such as the total route length and the like with the overlap.

EMBODIMENT 7

In the aforementioned embodiment 1, the arranging positions are determined from the largest parts in the order of size in STEP ST22, the positions may be determined in other orders such that the arrangements are executed from the nearest part to the center of a part arranging region.

EMBODIMENT 8

In the aforementioned embodiment 1, the process of determining part arranging positions on the basis of the arrangement positions of blocks is executed only one time at STEP ST22, however the process may be repeated several times and the best part arrangement among the arrangements obtained may be adopted as the final part arrangement.

EMBODIMENT 9

In the aforementioned embodiments, the sizes of blocks are uniform, however the ratios of the block sizes may be integers.

EMBODIMENT 10

Figure 7:
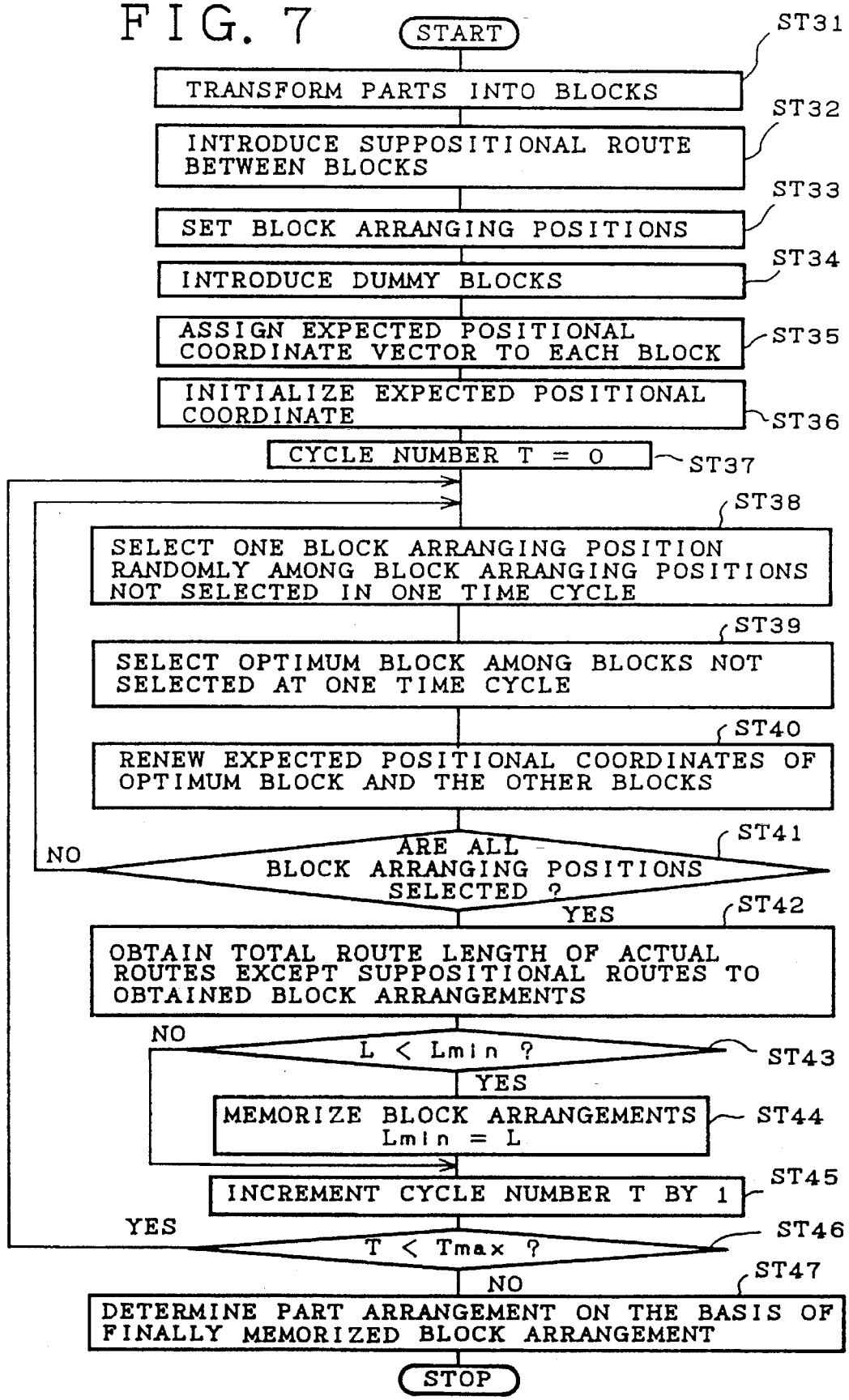
FIG. 7 is a flow chart showing the algorithm of the part arrangement optimizing method of the embodiment 10 of the invention.

Next, the embodiment 10 of the present invention will be described on reference to drawings. FIG. 7 is a flow chart showing the algorithm of the part arrangement optimizing method of the embodiment 10 of the invention; FIG. 8(a) and FIG. 8(b) are conceptual drawings showing a method introducing suppositional routes; and FIG. 9 is an explanatory drawing showing an example of the block arranging positions. In FIGS. 8(a), 8(b), reference numerals 1a, 1b designate parts; numerals 2a~2c. designate blocks; numerals 3a, 3b designate actually built routes (hereinafter referred to as "actual route"); and they are identical to those described before. Reference numerals 4a~4c designate suppositionally built routes between the blocks 2b and 2c or the blocks 2a and 2b (hereinafter referred to as "suppositional route"). In FIG. 9, reference numerals 5a~5i designate block arranging positions showing the central positions where each block is located; and the figures enclosed by the circles designate positional numbers, and each coordinate of them is given by $Xi=(Xi_1, Xi_2)$ [$i=1$~$N$: N designates the total number of the block arranging positions].

Next, the operation of the embodiment will be described. After starting the process, parts are suppositionally divided into the sets of blocks respectively uniform in size at first (STEP ST31). This transformation is done similarly to the case described about the embodiment shown in FIGS. 5(a), 5(b). Next, the suppositional routes are introduced between the blocks (STEP ST32). It will be described in the following section how to decide the suppositional routes using FIGS. 8(a), 8(b).

In FIGS. 8(a), 8(b), the part 1a is transformed into the blocks 2a, 2b; and the part 1b is transformed into the block 2c. One of the blocks transformed from one part is called as a "main block", and the other blocks are called as "sub-blocks". In the case of FIGS. 8(a), 8(b), the blocks 2a, 2c are the main blocks, and the block 2b is the sub-block. As shown in FIGS. 8(a), 8(b), the actual routes originally existed between the parts 1a, 1b become the routes between the main blocks (the routes between the blocks 2a, 2c in case of the drawings) when the parts are transformed into blocks. And, in the case where actual routes exist among main blocks, the same number of suppositional routes are supposed between the main blocks and the sub-blocks. In FIGS. 8(a), 8(b), since there are two actual routes between the main blocks 2a, 2b, two suppositional route 4a, 4b are also supposed between the main block 2c and the sub-block 2b, the other part. Moreover, the suppositional routes are supposed also between the blocks transformed from the same part. In the case of FIGS. 8(a), 8(b), since the blocks 2a, 2b are the ones transformed from the same part 1a, the suppositional route 4c is supposed between the blocks 2a, 2b. The number of the suppositional routes between the blocks transformed from the same part is a variant and should be optimized according to specific problems.

Next, block arranging positions are set (STEP ST33). The block arranging positions are usually set in an equally spaced lattice state in the part arranging region as shown in FIG. 9, and the spaces between each block arranging position 5a–5i are equal to the length of one side of the block. FIG. 9 shows an example of the block arranging positions in the case where the number of the blocks are nine. Next, dummy blocks which have no routes with other blocks are introduced so that the number of blocks becomes equal to the number of the block arranging positions (STEP ST24). Consequently, the total number of the blocks becomes N equal to the total number of the block arranging positions. Next, one vector having the same dimension as the coordinates of the block arranging positions is assigned to each block (STEP ST35). Hereinafter, the vector is referred to as an expected positional coordinate and denoted by $W_i=(W_{i_1}, W_{i_2})$ [i=1~N].

Next, the expected positional coordinates $W_i$ is initialized with appropriate random numbers in the part arranging region (STEP ST36). After that, the cycle number T is set to be zero (STEP ST37). Next, one block arranging position S is randomly selected among the block arranging positions not selected at the one time cycle yet (STEP ST38). And a block having expected positional coordinate $W_i$ nearest to the positional coordinate $X_s$ of the selected block arranging position S (hereinafter the block will be called as "the optimum block") is selected among the blocks not selected yet in the one time cycle (STEP ST39). If the relation mentioned above is designated by equations, the number "b" of the optimum block is given by the following equation (1).

$$b = \mathrm{argmin}\ (\|X_s - W_i\|^2) \quad i \in U \tag{1}$$

Therein, "U" is a set of the numbers of the blocks not yet selected at the one time cycle. For example, in the case where the bth block is selected as the optimum block to the block arranging position S, it means that the bth block is arranged at the block arranging position S in the cycle. Next, the expected positional coordinates of all the blocks are renewed by adding the renewing quantities given by the following equations (2) and (3) to the expected positional coordinates with the consideration of restricting conditions (STEP ST40).

$$\Delta W_i = (X_s - W_i) \times \epsilon \times f(i, b) \tag{2}$$

$$f(i, b) = 1 \quad i = b \tag{3}$$

$$f(i, b) = \alpha \times h_{i\ b} \quad i \neq b \tag{3}$$

Therein, "$\epsilon$" designates a constant called as "an expected positional coordinate renewing coefficient" and it is normally set to be not exceeding 1. And, f(i, b) becomes 1 when the ith block is the optimum block, and becomes $\alpha \times h_{i\ b}$ when the ith block is not the optimum block. Furthermore, "$\alpha$" designates a constant called as "a routing coefficient", and "$h_{i\ b}$" designates a number of the routes between the ith and the bth blocks. The route number $h_{i\ b}$ is the number including the suppositional routes as well as the actual routes. And the upper limit of $\alpha \times h_{i\ b}$ is 1, then if it is not 1, it is made to be 1.

Next, it is judged whether all block arranging positions were selected at the one time cycle or not (STEP ST41). If the result of the judgement shows that there are some block arranging positions not yet selected, then the system returns to the step selecting block arranging positions (STEP ST38). On the other hand, if all of the block arranging positions were selected, the total route length L of the actual routes to the determined block arrangement is obtained (STEP ST42). For example, in the case of block arranging positions shown in FIG. 9, this total route length L is calculated as the summation of the lengths of the horizontal direction ($X_1$ direction) and the perpendicular direction ($X_2$ direction) of two block arranging positions. Next, the obtained total route length L is compared with the minimum total route length Lmin obtained by the preceding cycles (STEP ST43). If the result of the comparison shows that the length L is smaller than the length Lmin, the new block arrangement obtained in this cycle is memorized as the optimum arrangement among the preceding arrangements, and the length L is substituted for the length Lmin as the smallest total route length (STEP ST44). On the other hand, in the case where the length L is Lmin or more, the STEP ST44 is skipped so as to not execute its processes. Up to this step, one time cycle has been done, and successively the number of cycles T is added 1 (STEP ST45).

Next, the cycle number T and a predetermined maximum cycle number Tmax are compared (STEP ST46). If the number T does not reach to the maximum number Tmax, the system begins the next cycle from the STEP ST38 again. Moreover, if the number T has reached the number Tmax, the part arranging positions are determined on the basis of the block arrangement finally memorized as the optimum arrangement and ends its processes (STEP ST47). When the part arranging positions are determined, for example, as described at STEP ST22 of the embodiment 1, parts are arranged from the largest part in the order of size to the positions not overlapping with already arranged parts with consideration for the extent of overlapping with the block sets transformed from the part and for the total route length. By executing above mentioned steps, the (quasi-) optimum arrangement in which the total route length is short is finally obtained.

Next, to show the efficiency of the aforesaid embodiment 10, the results of comparing the relaxation method, which is one of the prior art part arrangement optimizing methods, and the part arrangement optimizing method of the aforementioned embodiment 10 by computer simulation are shown. Herein, the aforementioned "relaxation method" means a part arranging method regarding the routes between parts as lines of force like elastic cords and arranging the parts at the part arranging positions near the equilibrium positions where the forces acting on the parts with the lines of force become balanced. The problem used in the comparison is the problem of arranging the 100 same sized parts on the 10×10 lattice points, and in this case, the supposition that routes exist between all parts at the probability of 0.5 is made.

Figure 10:
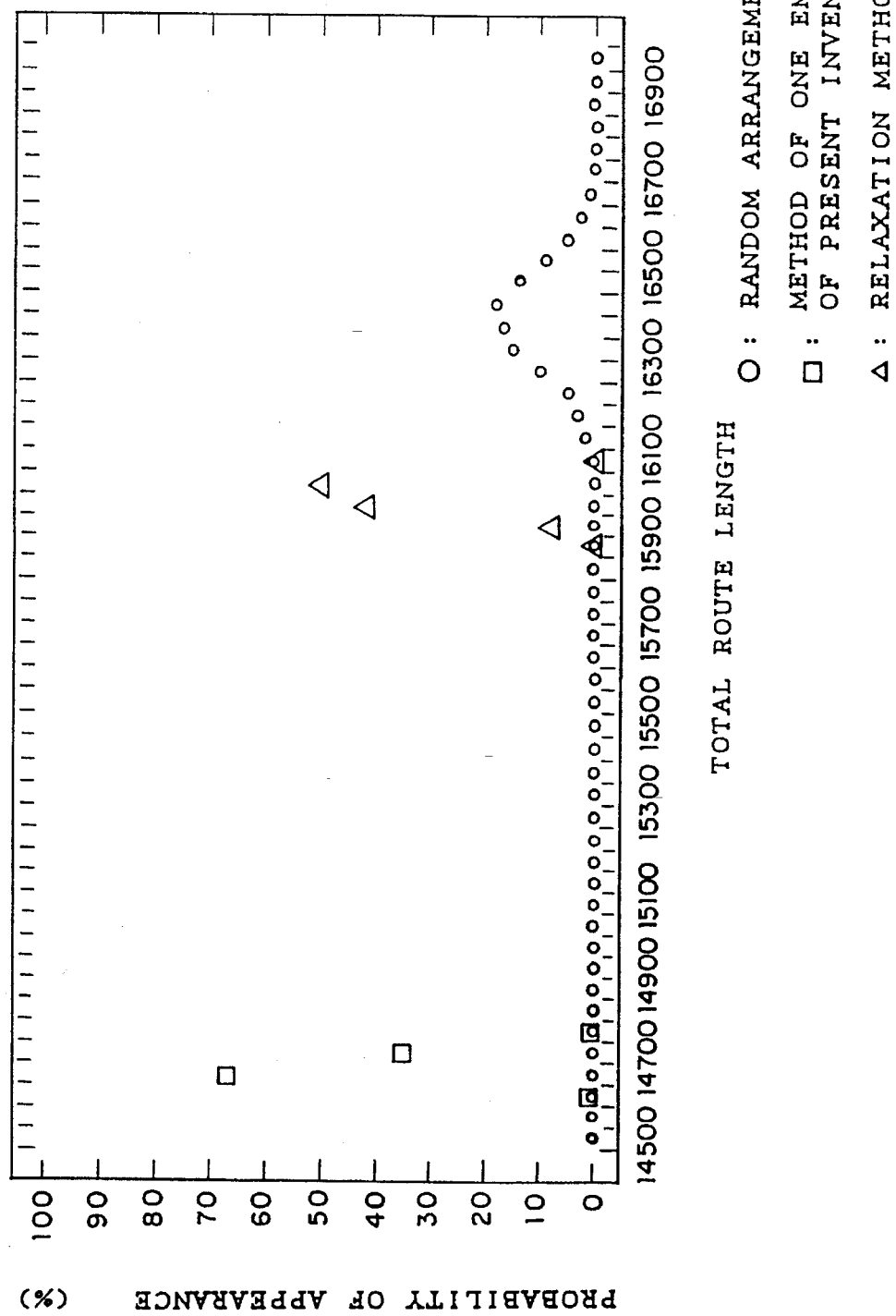
FIG. 10 is an explanatory drawing showing a result of the comparison of the performances between the part arrangement optimizing method of the aforementioned embodiment and the prior art relaxation method with a computer simulation.

The result of the computer simulation is shown in FIG. 10. FIG. 10 is a histogram of the total route length of the part arrangement obtained in the case where calculation time is made to be equal. That is to say, the axis of abscissas designates the total route length in the case where the spaces between the lattice points are made to be 1, and the axis of ordinates designates the probability of being able to obtain the part arrangement the total route length of which falls in each range divided by each 50 of the total route length. The computer used is SUN / SPARC 330 work station. And the time required at one time optimization made to be 2 minutes. The simulations were made 1,000 times for each method. As shown in FIG. 10, it is known that the relaxation method can obtain the part arrangements the total route lengths of which are somewhat shorter than those of the part arrangements randomly done, however the method in conformity with the embodiment 10 can obtain part arrangements the total route lengths of which are greatly shorter in comparison with those of the part arrangements randomly made and the relaxation method. The average values of the total route lengths are 16,395 for the randomly made part arrangement, 16,154 for the part arrangements according to the relaxation method, and 14,780 for the part arrangements according to the method of the embodiment 10.

EMBODIMENT 11

In the aforementioned embodiment 10, the selecting order of the block arranging positions in STEP ST38 is shown to be randomly done, however it may be determined according to some criterion.

EMBODIMENT 12

In the aforementioned embodiment 10, the parameters "$\epsilon$" and "$\alpha$" are fixed to a certain values during learning, but they may be changed during the learning, furthermore different values to the actual routes and the suppositional routes may be used as the parameter "$\alpha$".

EMBODIMENT 13

In the aforementioned embodiment 10, it is aimed only to shorten the total route lengths as much as possible, however it is possible to optimize part arrangements with the consideration of other conditions, for example, that the routes should be arranged not to be packed, or that particular parts should be arranged closely to or apart from each other, or the like. For that sake, it may do, for example, to introduce the terms representing these conditions to the equation (1) and to select blocks so as to satisfy these conditions when the optimum blocks are selected at STEP ST21.

EMBODIMENT 14

In the aforementioned embodiment 10, the arranging positions of all parts are not determined previously, however even if there are some parts the arranging positions of which are previously determined, that is to say fixed parts, it can be done to optimize the arrangements of parts including the fixed parts by excepting the arranged positions of the fixed parts from the arranging regions of parts and blocks and by keeping the fixed parts in their arranged positions.

EMBODIMENT 15

In the aforementioned embodiment 10, the order of determining arranging positions is made to begin with the largest part in size in STEP ST47, however other orders, for example, the order which begins with the part nearest to the center of a part arranging region may be applicable.

EMBODIMENT 16

In the aforesaid embodiment 10, the process of determining part arranging positions on the basis of the arrangement positions of blocks is executed only one time at STEP ST47, however the process may be repeated several times and the best part arrangement among the arrangements obtained may be adopted as the final part arrangement.

EMBODIMENT 17

The aforementioned embodiment 10 may be combined with the aforementioned embodiment 1. That is to say, after transforming parts into blocks, block arrangements may be optimized with the methods of the embodiment 10 and the embodiment 1, then part arrangements may be optimized on the basis of the block arrangements.

EMBODIMENT 18

In the aforementioned embodiment 10, the function f(i, b) used in the equation (2) is defined as the equation (3), however the function f(i, b) is not restricted to the equation (3) and may be other functions. For example, as shown in the next equation (4), the influence through other parts may be considered in the function. In the following equation (4), "$\alpha_1$" is a constant.

$$f(i,b)=1 \quad i=b \tag{4}$$

$$f(i,b)=\alpha \times h_{i,b}+\epsilon_j \alpha \times h_{j,b} \times \alpha_1 \times h_{i,j} \quad i \neq b \tag{4}$$

EMBODIMENT 19

Figure 11:
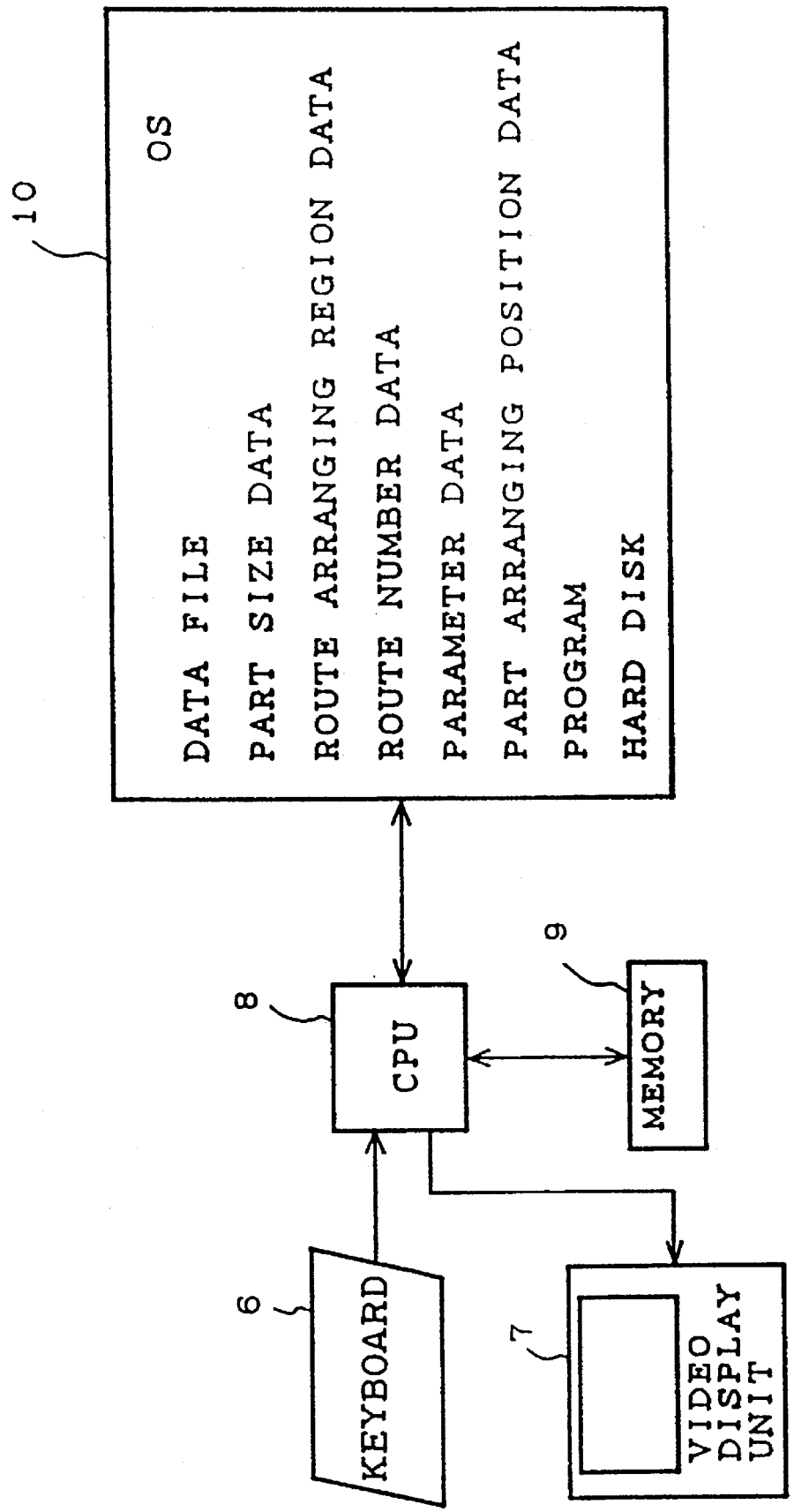
FIG. 11 is a block diagram showing a construction of a computer system realizing the part arrangement optimizing method of the embodiment 18 of the invention.

Next, the embodiment 19 of the present invention will be described on reference to the drawings. FIG. 11 is a block diagram showing an example of a computer system executing the part arrangement optimizing method of the present invention. In FIG. 11, reference numeral 6 designates a keyboard inputting such as indications from an operator, and numeral 7 designates a visual display unit displaying processed results and the like. Reference numeral 8 designates a central processing unit (hereinafter referred to as "CPU"), and numeral 9 designates a memory used by the CPU 8 for memorizing data and the like in process of its processing operation. Reference numeral 10 designates a hard disk connected to the CPU 8 and the hard disk 10 previously memorizes not only an operating system (OS) but also part size data, part arranging region data, route number data between parts, parameter data such as block sizes and the like and part arranging position data as data files, and further programs and so forth.

Next, the operation of the embodiment will be described. Now, FIG. 12 is a flow chart showing the algorithm of the operation. At first, inputting a program name with the keyboard 6, the corresponding program is loaded into the memory 9 from the hard disk 10 and the execution of the program is begun (STEP ST51). Hereafter, processes are executed in conformity with the program. Next, the data memorized in the hard disk 10 such as part size data, part arranging region data, route number data, parameter data and the like are loaded into the memory 9 (STEP ST52). Next, how each part is transformed into some blocks is calculated by the CPU 8 on the basis of the block size data and the part size data which are the ones of the parameter data, and each block is numbered one by one from 1, and then, the results of the calculation are memorized with the total number data of the blocks into the memory 8 (STEP ST53). The parts are transformed into block sets the whole body of which becomes larger than the parts, as described in STEP ST11 of the embodiment 1.

Next, the CPU 8 calculates block arranging positional coordinates on the basis of the part arranging region data and the block size data, and numbers each block arranging position one by one from 1 to memorize the results into the memory 9 (STEP ST54). The block arranging positions are usually set in part arranging regions in an equally spaced lattice state. The spaces of the block arranging positions are made to be equal to the block size (or the length of one side of the block). Next, the CPU 8 calculates values which are the results of subtracting the block number from the total number of the block arranging positions, and the values are memorized into the memory 9 as dummy block numbers (STEP ST55). Furthermore, the dummy blocks are also numbered one by one from the number larger than the maximum value of the block numbers numbered at STEP ST27 by 1. The dummy blocks have no route with any other block.

Next, the blocks are initially arranged (STEP ST56). That is to say, block arranging positional numbers arranging blocks are determined to each block by means of the CPU 8, and the results are memorized into the memory 9. When the blocks are arranged, the blocks transformed from the same part necessarily do not keep the shape of the original part, but they are arranged so as to adjoin with at least one other block mutually. So long as this condition is satisfied, the initial arranging positions of the blocks may be determined randomly, or may be determined so that total route length becomes shorter by some extent with methods such as the pair-linking method, the cluster-development method, the force placement method or the like. After that, one time cycle is started (STEP ST57). Successively, a block set {Bi} which is a set of blocks transformed from the same part is selected from the blocks which are not selected yet at the one time cycle by means of the CPU 8 on the basis of the data such as part transforming data into blocks and the like (STEP ST58). Therein, the suffix "i" of "B" is made to designate the number of a block.

Next, a block set {Bj} which makes total route length shortest in case of interchanging arranged positions with the selected block set {Bi} is obtained from the block sets capable of being interchanged with the selected block set {Bi} (dummy blocks may be included in this case) by means of the CPU 8 on the basis of the data such as part transforming data into blocks, the route number data, part arranging positional coordinate data, block arranging positional data and the like (STEP ST59). Herein, the term "block sets capable of being interchanged" means block sets that include the same number of blocks as the block set {Bi} and all of the blocks transformed from the same part, and that there are no isolated blocks, like the description at STEP ST17 of the embodiment 1.

Next, it is judged by means of the CPU 8 whether the total route length becomes shorter or not in case of interchanging the arranged position of the block set {Bi} with that of the block set {Bj} in comparison with the case of non-interchanging (STEP ST60). The arranged positions of the block set {Si} and the block set {Bj} are interchanged if the judgement shows that the total route length becomes shorter (STEP ST61); and if the judgement shows that the total route length does not become shorter, the STEP ST61 is skipped so as to not interchange the block set {Bi} with the block set {Bj}. Herein, the term "interchanging the arranged positions of the blocks" means interchanging corresponding block arranging positional numbers in the block arranging positional number data. At this time, the arranged positions of the blocks transformed from the same part are determined so as to adjoin at least one block mutually after being interchanged, too.

Next, it is judged by means of the CPU 8 whether all blocks except the dummy blocks are selected in the one time cycle or not (STEP ST62). If the result of the judgement shows that there are some blocks not selected yet, then the system returns to STEP ST58 and selects the next block set among the residual blocks except the dummy blocks. On the other hand, if all of the blocks are selected, the reducing rate of the total route length by the one time cycle is calculated by means of the CPU 8, and it is judged by means of the CPU 8 whether the value of the reducing rate is smaller than a predetermined value or not (STEP ST63). If the reducing rate is somewhat larger, there is improving capability still in the arrangement, then the system returns to STEP ST57 and begins the next cycle. If the reducing rate is smaller than the predetermined value, the system determines part arranging positions by means of the CPU 8 on the basis of the block arranging positional data, part transforming data into blocks and the like, and memorizes the results into the hard disk 10 to end (STEP ST64).

Besides, these part arranging positions are determined on the basis of the final block arranging positions. In the case where the shapes of the block sets transformed from the same part are same as the shape of the original part, the positions where the block sets are located are made to be the part arranging positions as they are so long as no part is arranged there. In the case where the shapes of the block sets are different from the shape of the original part, for example, the positions which overlap with the block sets transformed from the part most largely and do not overlap with the parts already arranged are made to be the part arranging positions. If there is no overlap because parts are arranged, positions near to the block sets as much as possible are made to be the part arranging positions. Moreover, the determination of the arranging positions is begun from the largest part in the order of size. After above mentioned steps, finally the (quasi-) optimum arrangement the total route length of which is shorter can be obtained.

EMBODIMENT 20

In the embodiment 19 mentioned above, the case where the total route length is applied as the evaluation criterion of arrangements has been described, arbitrary evaluation criterions and the combinations of them may be used as the evaluation criterion so long as they can evaluate. In this case, evaluation function is set so that its values become smaller as the arrangement becomes nearer to the optimum arrangement, then the evaluation function values may be used in the place of the total route length.

EMBODIMENT 21

In the aforementioned embodiment 19, the arrangements are improved with the method interchanging two blocks or block sets, that is to say the pairwise interchanging method, so that the total route length becomes shorter, however other methods such as the relaxation method and the like may be used so long as they are the methods interchanging or replacing two or plural block sets, and they can also optimize the arrangements.

EMBODIMENT 22

In the aforementioned embodiment 19, the block sets can be interchanged under the condition that there are no isolated blocks in the block sets, however block sets may be interchangeable ones so long as they exist near to each other. In this case, also, the arrangements can be optimized.

EMBODIMENT 23

In the aforementioned embodiment 19, the arranging positions of all parts are not determined previously, however even if there are some parts the arranging positions of which are previously determined, that is to say fixed parts, the parts including the fixed parts can be optimized similarly by excepting the arranged positions of the fixed parts from the part arranging regions and the part arranging positions and making the fixed parts be always arranged at positions they are arranged.

EMBODIMENT 24

In the aforementioned embodiment 19, the part arranging positioned are determined with the consideration of the overlap with the block sets in STEP ST64, however the part arranging positions may be determined with the consideration of the total route length and the like with the overlap.

EMBODIMENT 25

In the aforementioned embodiment 19, the arranging positions are determined from the largest parts in the order of size in STEP ST64, the positions may be determined in other orders such that the arrangements are executed from the nearest part to the center of a part arranging region.

EMBODIMENT 26

In the aforementioned embodiment 19, the process of determining part arranging positions is executed only one time at STEP ST64, however the process may be repeated several times from the undetermined state of part arrangement and the best part arrangement among the arrangements obtained may be adopted as the final part arrangement.

EMBODIMENT 27

In the aforementioned embodiment 19, the sizes of blocks are uniform, however the ratios of the block sizes may be integers.

EMBODIMENT 28

The aforementioned embodiment 19 is described about the embodiment which has realized the part arrangement optimizing method of the embodiment 1 shown in FIG. 4 by means of the computer system, the other part arrangement optimizing methods such as the embodiment 10 shown in FIG. 7 may be applicable. In that case, the apparatus for optimizing part arrangements can be obtained by realizing above-mentioned methods by means of the computer system like the aforementioned embodiment 19.

It will be appreciated from the foregoing description that, according to the first aspect of the invention, the part arrangement optimizing method is constructed to determine the arrangements of blocks so that the evaluation function values of the arrangements become small as much as possible after suppositionally transforming the parts into blocks or block sets respectively uniform in size, and to determine the arrangement positions of parts on the basis of the determined block positions, and consequently, a certain part becomes interchangeable with parts or part sets which have the same size as that of the part in spite of their shapes being different from that of the part, then the parts or proposals of parts interchangeable with the part greatly increase. As a result, the method has an effect that it can obtain part arrangements whose evaluation function values such as the total route length and the like are smaller.

Furthermore, according to the second aspect of the invention, the part arrangement optimizing method is constructed to suppositionally transform parts into blocks or block sets so that the size ratios of them are integers, and consequently, the method has effect that interchangeable parts or proposals of parts can be further increased.

Furthermore, according to the third aspect of the invention, the part arrangement optimizing method is constructed to arrange a part at a part arranging position near an expected positional coordinate so that the part is located at the position where its evaluation function value becomes small as much as possible while the method renews the expected positional coordinate assigned to each part, and consequently, the method has an effect that the method can obtain part arrangements whose evaluation function values such as the total route length and the like are smaller more rapidly.

Furthermore, according to the fourth aspect of the invention, the part arrangement optimizing method is constructed to determine part arranging positions on the basis of finally determined block arrangements by executing the similar processes to the aforementioned processes after suppositionally transforming the parts into blocks uniform in size, and consequently, the method has an effect that the method can obtain part arrangements whose evaluation function values such as the total route length and the like are smaller more rapidly.

Furthermore, according to the fifth aspect of the invention, the part arrangement optimizing method is constructed to suppositionally transform parts into blocks so that the ratios of the size of the transformed blocks become integers, and consequently, the method has an effect that interchangeable parts or proposals of the parts can be further increased.

Furthermore, according to the sixth aspect of the invention, the part arrangement optimizing method is constructed to determine the arrangements of blocks by replacing plural blocks or block sets, the method has an effect that the process of the determination of block arrangements becomes easy.

Furthermore, according to the seventh aspect of the invention, the part arrangement optimizing method is constructed to determine part arranging positions from block arrangements with the consideration of the overlap of the blocks transformed from a part with the part and with the consideration of evaluation function values, the method has an effect that the process of the determination of part arranging positions from block arrangements becomes easy.

While preferred embodiments of the present invention have been described using specific terms, such description is for illustrative purposes only, and it is to be understood that changes and variations may be made without departing from the spirit or scope of the following claims.

What is claimed is:

1. A part arrangement optimizing method comprising the steps of:

(a) representing, in a computer memory, each of a plurality of parts to be arranged as a block or as a block set, such that the blocks are uniform in size;

(b) determining arrangements of said blocks and block sets so that evaluation function values corresponding to the plurality of parts are minimized;

(c) determining the arrangement of said parts on the basis of block arrangements determined in step (b); and (d) arranging said parts on the basis of the arrangement determined in step (c).

2. A part arrangement optimizing method comprising the steps of:

(a) representing, in computer memory, each of a plurality of parts to be arranged as a block or as a block set, such that the ratios of the sizes of which are integers;

(b) determining arrangements of said blocks and block sets so that evaluation function values corresponding to the plurality of parts are minimized;

(c) determining the arrangement of said parts on the basis of block arrangements determined in step (b); and (d) arranging said parts on the basis of the arrangement determined in step (c).

3. The part arrangement optimizing method according to claim 1 or 2, wherein step (b) determines said block arrangement so that said evaluation function values are minimized by replacing plural blocks or block sets.

4. The part arrangement optimizing method according to claim 3, wherein step (c) determines said part arrangement with consideration of the extent of the overlap of each part with said blocks representing said part and said evaluation function values.

5. The part arrangement optimizing method according to claim 1 or 2, wherein step (c) determines said part arrangement with consideration of the extent of the overlap of parts with said blocks representing said parts and said evaluation function values.

6. A computer implemented part arrangement optimizing method comprising the steps of:

(a) setting part arranging positions where parts are arranged;

(b) introducing dummy parts having no route with any other parts so that the number of said parts becomes equal to the number of said part arranging positions set in step (a);

(c) assigning expected positional coordinate vectors to each of said parts, each expected positional coordinate vector having the same dimensions as those of coordinates of said part arranging positions;

(d) selecting one part arranging position among said part arranging positions;

(e) selecting, among parts not yet selected, one optimum part having a minimal cost function value in said part arranging position selected in step (d);

(f) determining the arrangement of the optimum part selected in step (e) at the part arranging position selected in step (d);

(g) bringing the expected positional coordinates of said optimum part close to the part arranging position selected in step (d);

(h) renewing the expected positional coordinates of parts other than said optimum part in conformity with a restricting condition;

(i) determining the arrangements of all of said parts by repeating the processes from step (d) to step (h) for part arranging positions not yet selected until all of said part arranging positions have been selected;

(j) finally determining a part arrangement having a minimal evaluation function value as a final part arrangement by executing steps (d) to (I) one or more times; and (k) arranging said parts on the basis of the part arrangement determined in step (j).

7. A part arrangement optimizing method comprising the steps of:

(a) representing, in a computer memory, each of a plurality of parts to be arranged as a block or as a block set, such that the blocks are uniform in size;

(b) supposing a suppositional route between blocks representing the same part differently from an actual route;

(c) setting block arranging positions where blocks are arranged;

(d) introducing dummy blocks having no routes with any other blocks so that the number of said blocks becomes equal to the number of said block arranging positions set in step (c);

(e) assigning to each of said blocks, expected positional coordinate vectors having the same dimensions as those of coordinates of said block arranging positions;

(f) selecting one block arranging position among said block arranging positions;

(g) selecting, among blocks not yet selected, one optimum block having a minimal cost function value in said block arranging position selected in step (f);

(h) determining the arrangement of the optimum block selected in step (g) at the block arranging position selected in step (f);

(i) bringing the expected positional coordinates of said optimum block close to the block arranging position selected in step (f);

(j) renewing the expected positional coordinates of blocks other than said optimum block in conformity with a restricting condition;

(k) determining the arrangements of all of said blocks by repeating the processes from step gel to step (j) for block arranging positions not yet selected until all of said block arranging positions have been selected;

(l) determining a block arrangement having a minimal evaluation function value as a final block arrangement by executing steps (f) to (k) one or more times;

(m) determining said part arrangement on the basis of said block arrangement determined in step (l); and (n) arranging said parts on the basis of the part arrangement determined in step (m).

8. A part arrangement optimizing method comprising the steps of:

(a) representing, in a computer memory, each of a plurality of parts to be arranged as a block or as a block set, such that the blocks have sizes the ratios of which are integers;

(b) supposing a suppositional route between blocks representing the same part differently from an actual route;

(c) setting block arranging positions where blocks are arranged;

(d) introducing dummy blocks having no routes with any other blocks so that the number of said blocks becomes equal to the number of said block arranging positions set in step (c);

(e) assigning to each of said blocks, expected positional coordinate vectors having the same dimensions as those of coordinates of said block arranging positions;

(f) selecting one block arranging position among said block arranging positions;

(g) selecting, among blocks not vet selected, one optimum block having a minimal cost function value in said block arranging position selected in step (f);

(h) determining the arrangement of the optimum block selected in step (g) at the block arranging position selected in step (f);

(i) bringing the expected positional coordinates of said optimum block close to the block arranging position selected in step (f);

(j) renewing the expected positional coordinates of blocks other than said optimum block in conformity with a restricting condition;

(k) determining the arrangement of all of said blocks by repeating the processes from step (f) to step (j) for block arranging positions not yet selected until of all of said block arranging positions have been selected;

(l) determining a block arrangement having a minimal evaluation function value as a final block arrangement by executing steps (f) to (k) one or more times;

(m) determining said part arrangement on the basis of said block arrangement determined in step (l); and (n) arranging said parts on the basis of the part arrangement determined in step (m).

9. The part arrangement optimizing method according to claim 7 or 8, wherein step (m) determines said part arrangement with consideration of the extent of the overlap of parts with said blocks representing said parts and said evaluation function values.

* * * * *

UNITED STATES PATENT AND TRADEMARK OFFICE

CERTIFICATE OF CORRECTION

PATENT NO. : 5,600,555

DATED : February 4, 1997

INVENTOR(S): Masanobu Takahashi and Kazuo Kyuma

It is certified that error appears in the above-identified patent and that said Letters Patent is hereby corrected as shown below:

Column 9, line 65 in the equation please change "$W_1$" to -- $W_i$ --.
Column 10, line 11 in the equation please change "$W_1$" to -- $W_i$ --.
Column 10, line 15 in the equation please change "$h_{1b}$" to -- $h_{ib}$ --.
Claim 6, line 16, change "(I)" to -- (i) --.
Claim 7, line 53 change "gel" to -- (f) --.

Signed and Sealed this

Fifth Day of August, 1997

Attest:

BRUCE LEHMAN

Attesting Officer     Commissioner of Patents and Trademarks